United States Patent
Han

(10) Patent No.: US 10,345,966 B2
(45) Date of Patent: Jul. 9, 2019

(54) TOUCH INTEGRATED CIRCUIT USING TIME-DIVISION AND TOUCH SCREEN DISPLAY DEVICE INCLUDING THE SAME

(71) Applicant: LG Display Co., Ltd., Seoul (KR)

(72) Inventor: Man Hyeop Han, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/468,555

(22) Filed: Aug. 26, 2014

(65) Prior Publication Data

US 2015/0077387 A1 Mar. 19, 2015

(30) Foreign Application Priority Data

Sep. 13, 2013 (KR) .......................... 10-2013-0110389

(51) Int. Cl.
*G06F 3/045* (2006.01)
*G06F 3/044* (2006.01)

(52) U.S. Cl.
CPC .... *G06F 3/044* (2013.01); *G06F 2203/04106* (2013.01)

(58) Field of Classification Search
CPC ....................... G06F 2203/04106; G06F 3/044
USPC .......................................................... 345/174
See application file for complete search history.

(56) References Cited

U.S. PATENT DOCUMENTS

| | | | |
|---|---|---|---|
| 2008/0007539 A1* | 1/2008 | Hotelling | G06F 3/044 345/173 |
| 2011/0084937 A1 | 4/2011 | Chang et al. | |
| 2011/0175834 A1* | 7/2011 | Han | G06F 3/044 345/173 |
| 2012/0007831 A1* | 1/2012 | Chang | G06F 3/0416 345/174 |
| 2012/0169660 A1* | 7/2012 | Seo | G06F 1/3262 345/174 |
| 2013/0093711 A1* | 4/2013 | Liu | G06F 3/044 345/174 |
| 2013/0093712 A1* | 4/2013 | Liu | G06F 3/0418 345/174 |
| 2013/0181937 A1* | 7/2013 | Chen | G06F 3/044 345/174 |

(Continued)

FOREIGN PATENT DOCUMENTS

| | | | |
|---|---|---|---|
| CN | 102043507 A | 5/2011 | |
| CN | 102681715 A | 9/2012 | |

OTHER PUBLICATIONS

Chinese Office Action for corresponding Chinese Patent Application No. 201410415656 dated Feb. 14, 2017.

*Primary Examiner* — Jonathan M Blancha

(74) *Attorney, Agent, or Firm* — Morgan, Lewis & Bockius LLP

(57) ABSTRACT

A touch screen display device includes a display panel, a touch screen panel disposed on the display panel, and configured to include a plurality of first electrodes, which are parallelly arranged in a first direction, and a plurality of second electrodes which are parallelly arranged in a second direction, a switching unit configured to apply a first touch scan pulse to the plurality of first electrodes during a first period, and apply a second touch scan pulse to the plurality of first and second electrodes during a second period, a first touch sensing unit configured to apply the first touch scan pulse to the switching unit, and a second touch sensing unit configured to apply the second touch scan pulse to the switching unit.

12 Claims, 9 Drawing Sheets

(56) References Cited

U.S. PATENT DOCUMENTS

2014/0043283 A1\* 2/2014 Kim ................... G06F 3/0416
    345/174

\* cited by examiner

TOUCH INTEGRATED CIRCUIT USING TIME-DIVISION AND TOUCH SCREEN DISPLAY DEVICE INCLUDING THE SAME

CROSS-REFERENCE TO RELATED APPLICATIONS

This application claims the benefit of the Korean Patent Application No. 10-2013-0110389 filed on Sep. 13, 2013, which is hereby incorporated by reference as if fully set forth herein.

BACKGROUND OF THE INVENTION

Field of the Invention

The present invention relates to a display device, and more particularly, to a touch integrated circuit (IC) and a touch screen display device including the same.

Discussion of the Related Art

Touch screens are a type of input device that is included in display devices such as Liquid Crystal Displays (LCDs), Field Emission Displays (FEDs), Plasma Display Panels (PDPs), Electroluminescent Displays (ELDs), and Electrophoretic Displays (EPDs), and enables a user to input information by directly touching a screen with a finger, a pen or the like while looking at the screen of the display device.

Touch screens sense a touch by using various types. Recently, mutual-capacitive touch screens are attracting much attention. The mutual-capacitive touch screens supply a driving voltage to a touch driving electrode to allow a mutual capacitance to be generated between the touch driving electrode and a touch sensing electrode, and measure a change (which is caused by a touch) in the mutual capacitance to determine whether there is the touch.

In sensing a touch based on the mutual capacitance type, when a touched area is very small, it is difficult to sense the touch because a capacitance change is too small.

In detail, in a pen touch input which is mainly used recently, since a pen touch area is far smaller than a finger touch area which is averagely input, it is difficult to sense a pen touch, and a separate pen touch input device is needed for sensing the pen touch.

SUMMARY OF THE INVENTION

Accordingly, the present invention is directed to a touch integrated circuit (IC) and a touch screen display device including the same that substantially obviate one or more problems due to limitations and disadvantages of the related art.

An object of the present invention is to provide a touch IC for sensing a finger touch and a pen touch and a touch screen display device including the same, which senses a pen touch in addition to a finger touch without adding a separate device.

Additional features and advantages of the invention will be set forth in the description which follows, and in part will be apparent from the description, or may be learned by practice of the invention. The objectives and other advantages of the invention may be realized and attained by the structure particularly pointed out in the written description and claims hereof as well as the appended drawings.

To achieve these and other advantages and in accordance with the purpose of the present invention, a touch screen display device includes a display panel; a touch screen panel disposed on the display panel, and configured to include a plurality of first electrodes, which are parallelly arranged in a first direction, and a plurality of second electrodes which are parallelly arranged in a second direction; a switching unit configured to apply a first touch scan pulse to the plurality of first electrodes during a first period, and apply a second touch scan pulse to the plurality of first and second electrodes during a second period; a first touch sensing unit configured to apply the first touch scan pulse to the switching unit; and a second touch sensing unit configured to apply the second touch scan pulse to the switching unit.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of the present invention will be described in detail with reference to the accompanying drawings.

Figure 1:
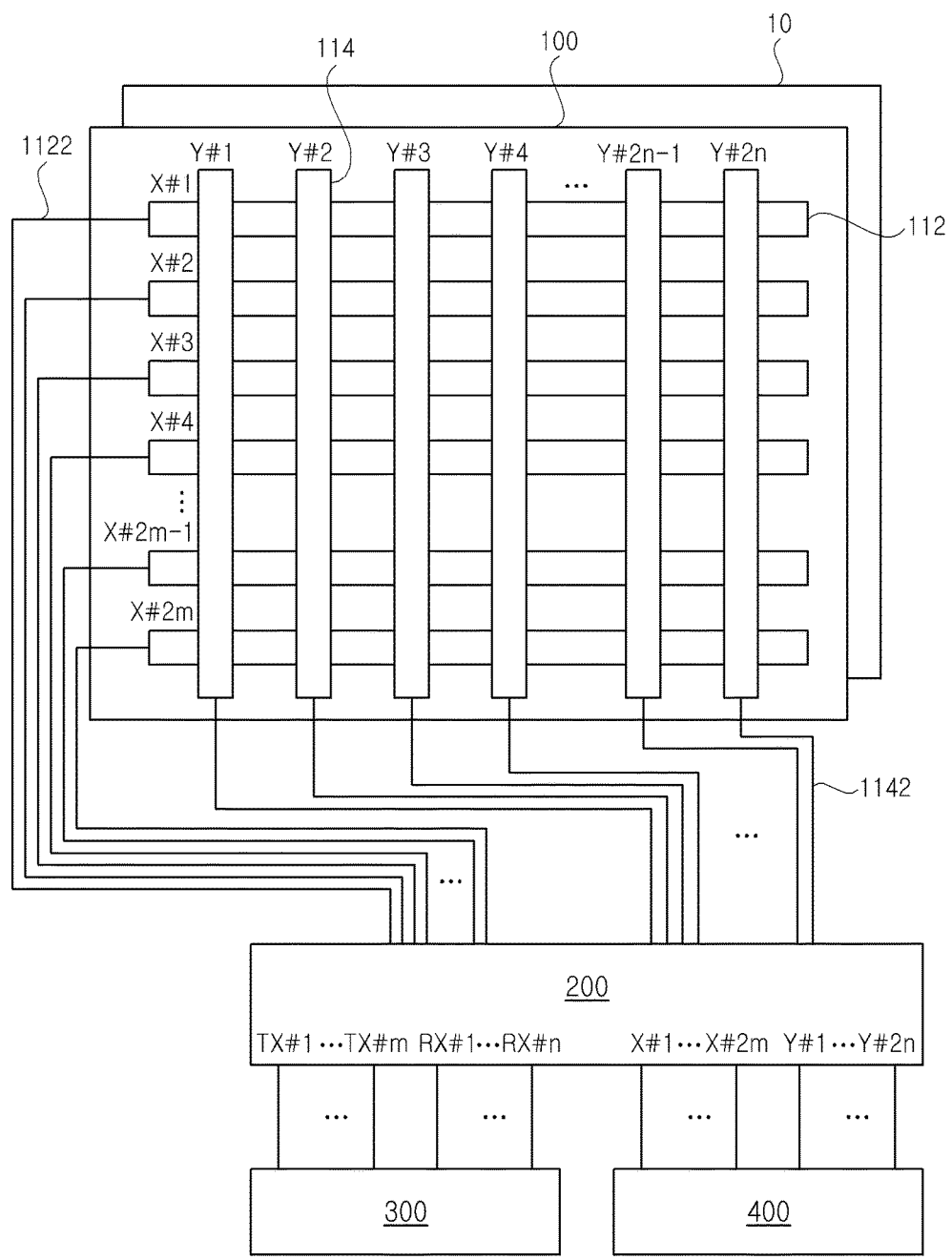
FIG. 1 is a diagram schematically illustrating a configuration of a touch screen display device according to embodiments of the present invention.
Figure 2:
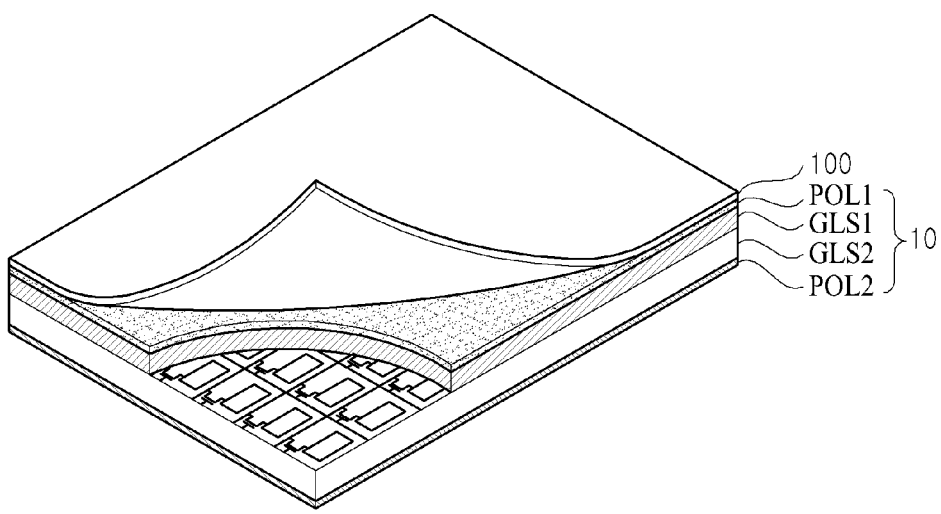
FIGS. 2 and 3 are diagrams illustrating examples of a combination of a touch screen panel and display panel of FIG. 1.
Figure 3:
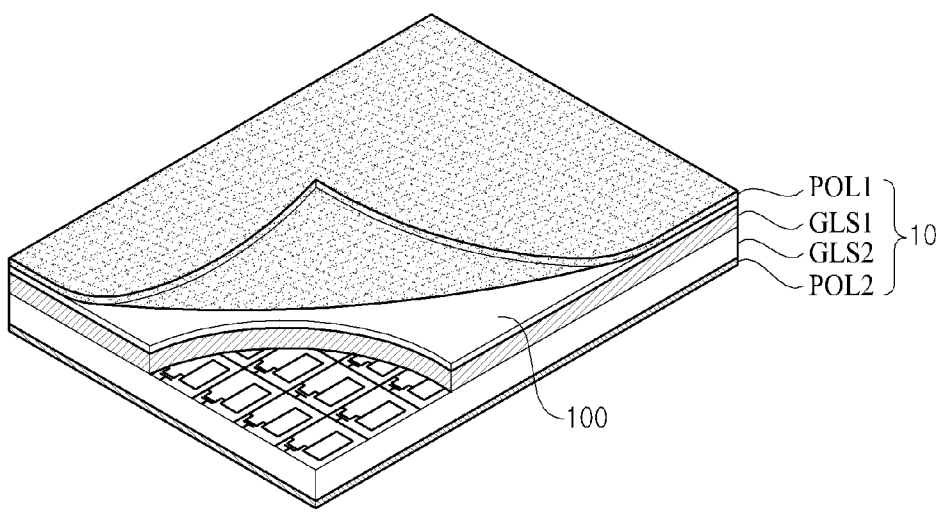

FIG. 1 is a diagram schematically illustrating a configuration of a touch screen display device according to embodiments of the present invention, and FIGS. 2 and 3 are diagrams illustrating examples of a combination of a touch screen panel and display panel of FIG. 1.

As illustrated in FIG. 1, the touch screen display device includes a display panel 10, a touch screen panel 100, a switching unit 200, a first touch sensing unit 300, and a second touch sensing unit 400.

In this disclosure below, for convenience of description, an LCD device will be described as an example of the display panel 10 of the touch screen display device according to embodiments of the present invention, but the present invention may be applied to various display devices such as LCD devices, FEDs, PDPs, ELDs, and EPDs without being limited thereto. Also, a general configuration of the LCD device will be briefly described.

The display panel 10 includes two substrates GLS1 and GLS2, and a liquid crystal layer is formed therebetween. A lower substrate GLS2 may include a plurality of data lines, a plurality of gate lines, and a plurality of thin film transistors (TFTs), and an upper substrate GLS1 may include a black matrix and a color filter. The display panel 10 may be configured in a color filter-on TFT (COT) structure where the black matrix and the color filter are formed on the lower substrate GLS2.

The display panel 10 may be implemented in all liquid crystal modes, which are known to those skilled in the art, such as a twisted nematic (TN) mode, a vertical alignment (VA) mode, an in-plane switching (IPS) mode, a fringe field switching (FFS) mode, etc.

The touch screen panel 100 is disposed on the display panel 10, and includes a plurality of first electrodes 112 and a plurality of second electrodes 114. The plurality of first electrodes 112 are parallelly arranged in a first direction, and the plurality of second electrodes 114 are parallelly arranged in a second direction.

For example, as illustrated in FIG. 2, the touch screen panel 100 may be disposed on an upper polarizer POL1 of the display panel 10. Alternatively, as illustrated in FIG. 3, the touch screen panel 100 may be disposed between the upper polarizer POL1 and the upper substrate GLS1.

The plurality of first electrodes 112 may be connected to the switching unit 200 through a plurality of first electrode lines 1122, and the plurality of second electrodes 114 may be connected to the switching unit 200 through a plurality of second electrode lines 1142.

For example, the plurality of first electrodes 112 and the plurality of second electrodes 114 may be disposed on the same layer or different layers on one substrate, or may be disposed on different substrates. In this case, the plurality of first electrodes 112 are electrically insulated from the plurality of second electrodes 114.

Moreover, the touch screen panel 100 is disposed on the display panel 10, and thus, the plurality of first electrodes 112 and second electrodes 114 which are included in the touch screen panel 100 may be formed of a transparent material such as indium tin oxide (ITO) in order for a viewer to view a screen of the display panel 10.

The switching unit 200 applies a first touch scan pulse to the plurality of first electrodes 112 during a first period, and applies a second touch scan pulse to the plurality of first and second electrodes 112 and 114 during a second period.

Hereinafter, a detailed configuration and driving timing of the switching unit 200 will be described in more detail with reference to FIGS. 4 to 8.

Figure 4:
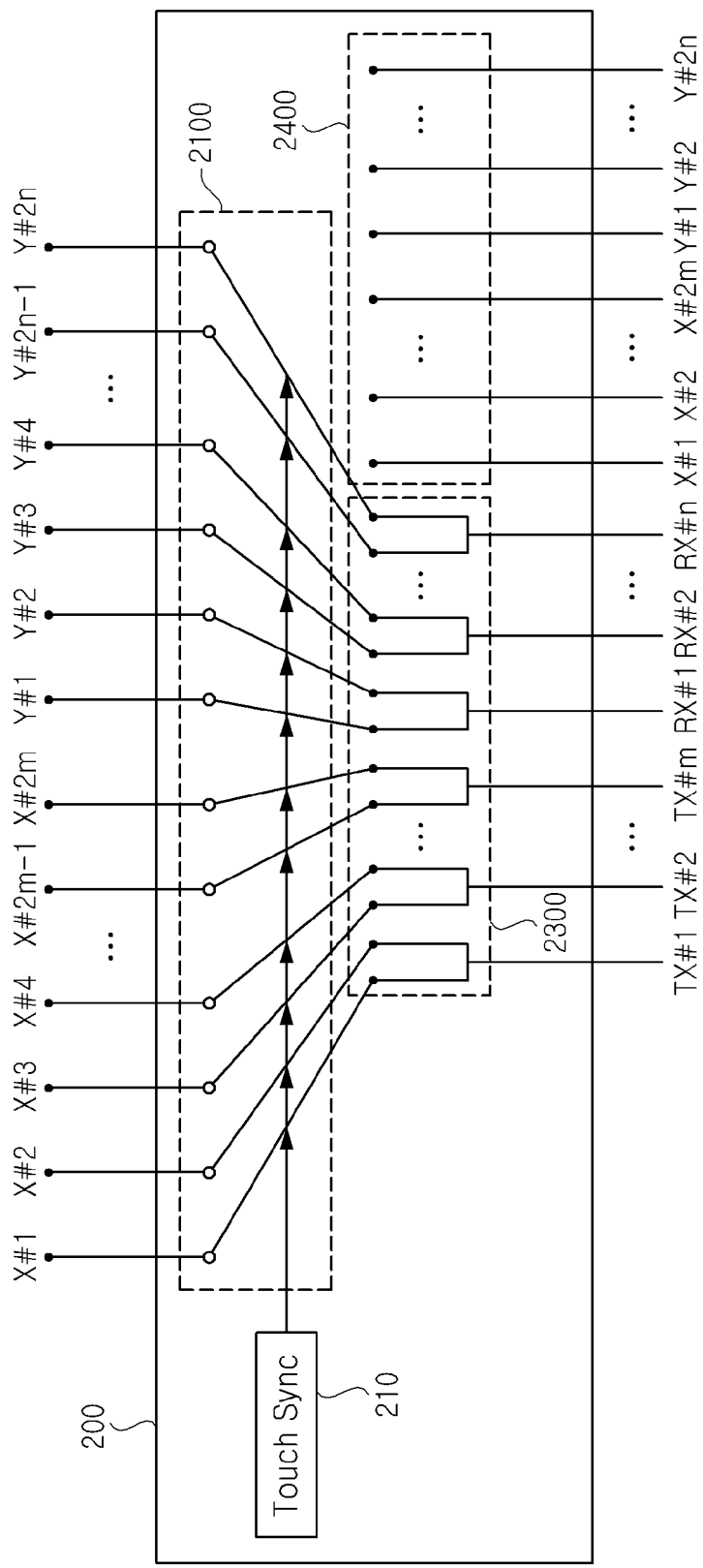
FIG. 4 is a diagram illustrating an example of a configuration of a switching unit of FIG. 1.
Figure 5:
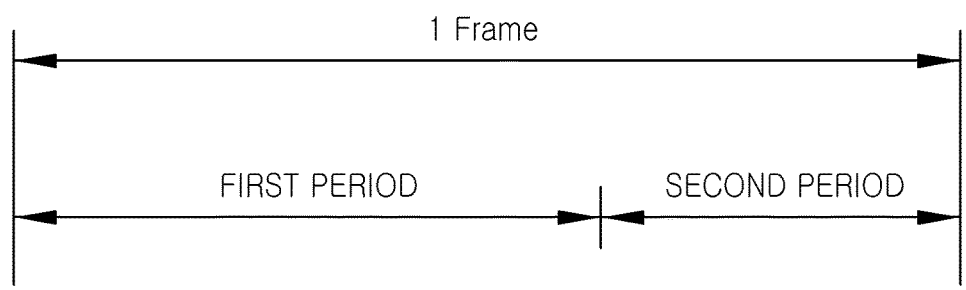
FIG. 5 is a timing chart showing an example of a method of driving a touch screen display device according to embodiments of the present invention.
Figure 6:
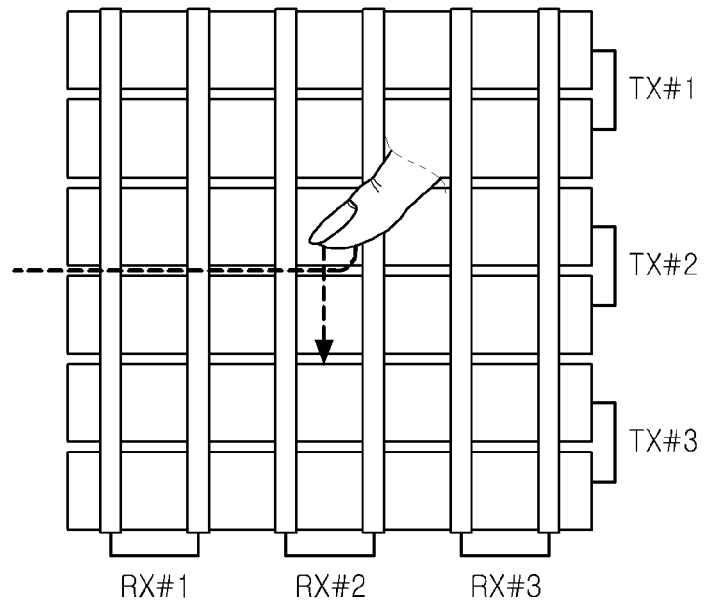
FIG. 6 is a diagram illustrating an example of a touch driving method in first and second periods in a touch driving mode of FIG. 5.
Figure 6:
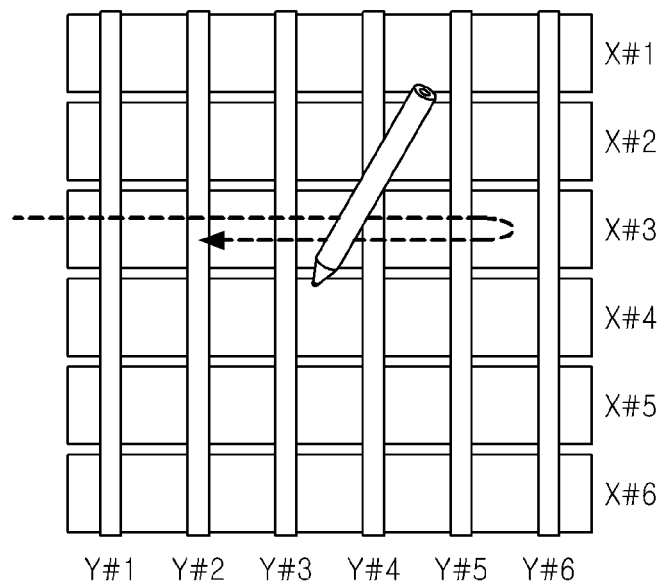
Figure 7:
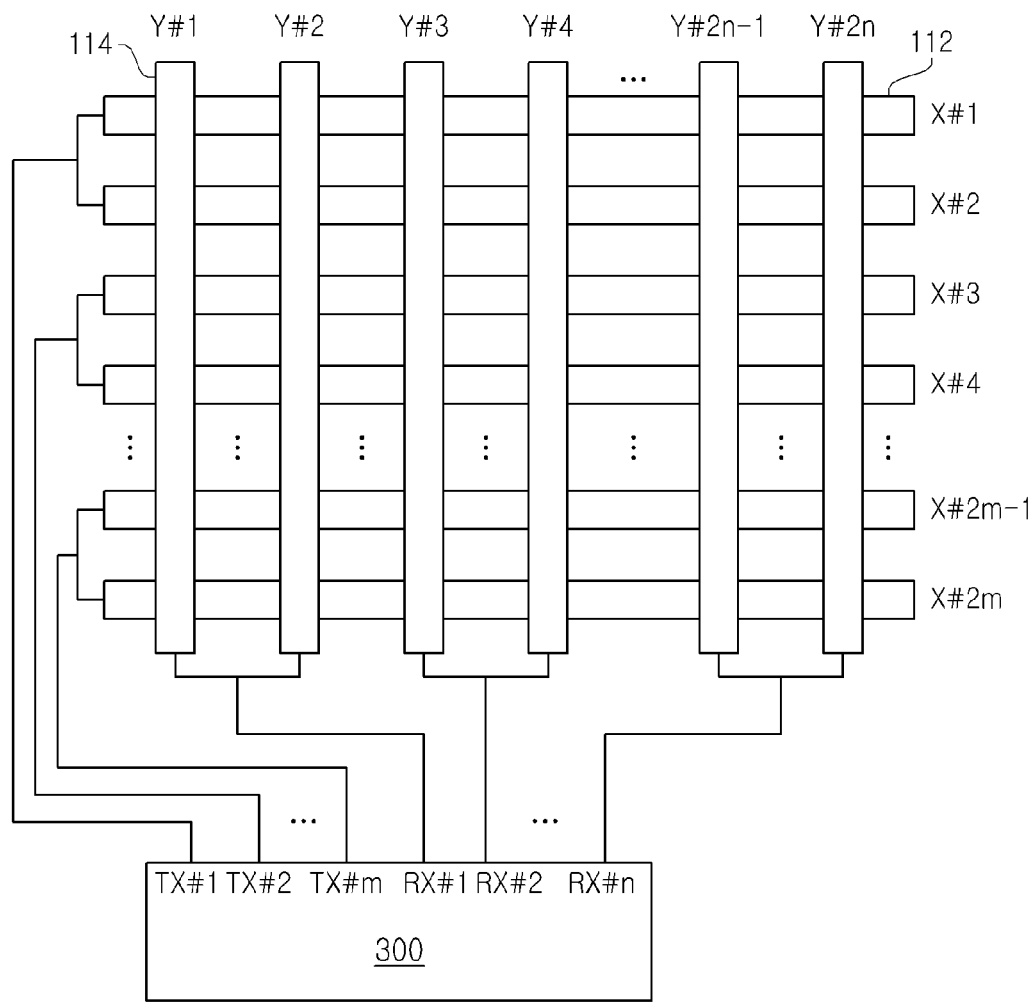
FIGS. 7 and 8 are diagrams illustrating examples of a connection state between electrodes in the first and second periods of FIG. 5.
Figure 8:
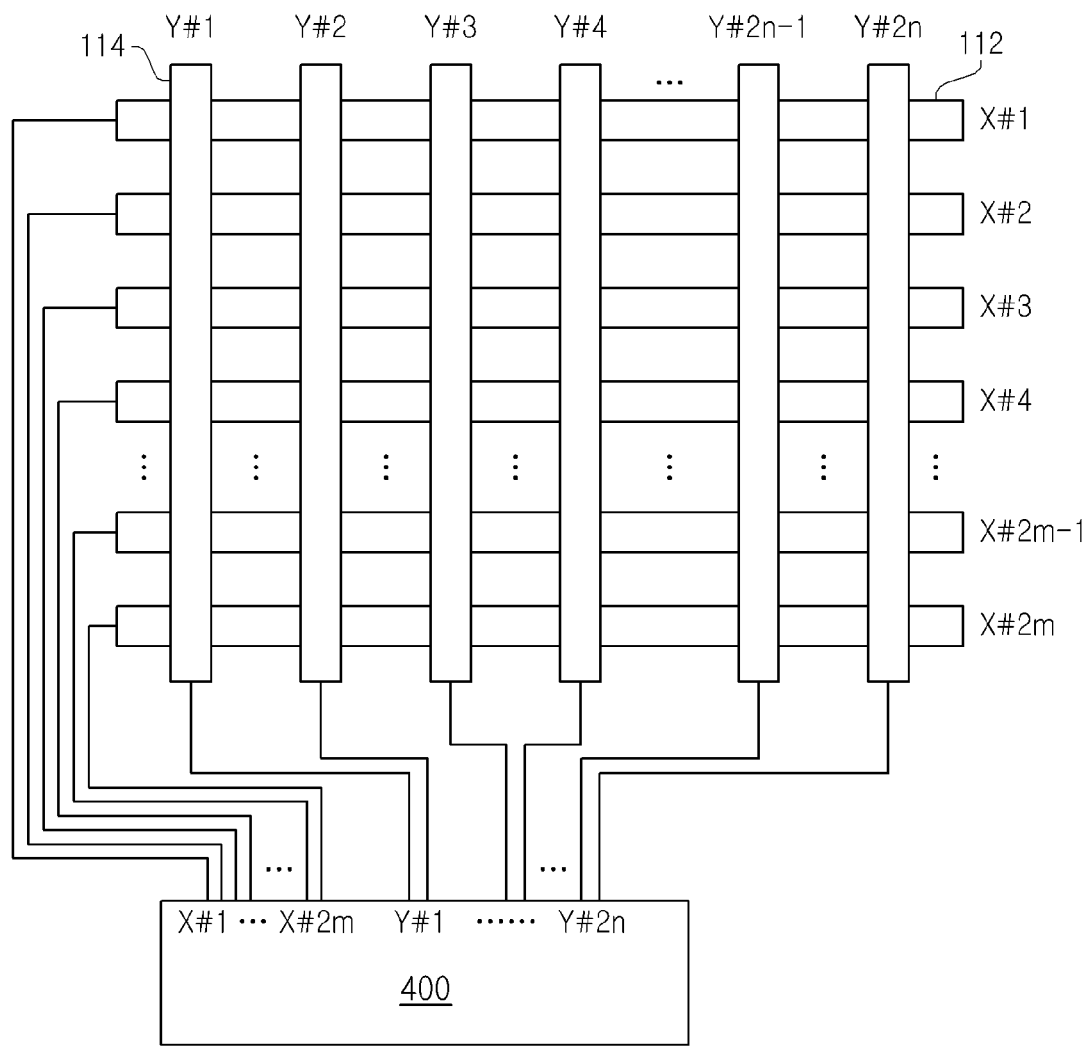

FIG. 4 is a diagram illustrating an example of a configuration of a switching unit of FIG. 1. FIG. 5 is a timing chart showing an example of a method of driving a touch screen display device according to embodiments of the present invention. FIG. 6 is a diagram illustrating an example of a touch driving method in first and second periods in a touch driving mode of FIG. 5. FIGS. 7 and 8 are diagrams illustrating examples of a connection state between electrodes in the first and second periods of FIG. 5.

The switching unit 200, as illustrated in FIG. 4, may include a sync signal generator 210, a switch 2100, a first touch sensing unit connector 2300, and a second touch sensing unit connector 2400.

The sync signal generator 210 may generate a sync signal for distinguishing the first and second periods. For example, the sync signal may include a first sync signal, indicating a touch sensing mode during the first period, and a second sync signal indicating the touch sensing mode during the second period.

For example, as shown in FIG. 5, the touch screen display device according to embodiments of the present invention may temporally divide one frame into the first and second periods, for sensing a touch while an image is being displayed during the one frame, and sense a touch during the first and second periods.

Therefore, the synch signal generator 210 may output a first sync signal to the switch 2100 when operating in the touch sensing mode during the first period, and output a second sync signal to the switch 2100 when operating in the touch sensing mode during the second period.

For example, the touch screen display device according to embodiments of the present invention, as shown in FIG. 6, may sense a finger touch based on a mutual capacitance type during the first period, and during the second period, the display device may sense a pen touch based on a self-capacitance type. Although not shown, the touch screen display device may sense the pen touch based on the self-capacitance type during the first period, and during the second period, the touch screen display device may sense the finger touch based on the mutual capacitance type.

When the first sync signal is input, the switch 2100 connects the plurality of first and second electrodes 112 and 114 to the first touch sensing unit connector 2300. When the second sync signal is input, the switch 2100 connects the plurality of first and second electrodes 112 and 114 to the second touch sensing unit connector 2400.

The first touch sensing unit connector 2300 may group the plurality of first electrodes 112 by at least twos according to connect the grouped first electrodes to the first touch sensing unit 300, and group the plurality of second electrodes 114 by at least twos to connect the grouped second electrodes to the second touch sensing unit 400, according to an operation of the switch 2100 which is performed by the second sync signal during the first period.

For example, as illustrated in FIG. 4, the first touch sensing unit connector 2300 may group the plurality of first electrodes 112 by at least twos to connect the grouped first electrodes to the first touch sensing unit 300, and may group the plurality of second electrodes 114 by at least twos to connect the grouped second electrodes to the second touch sensing unit 400. Also, although not shown, the first touch sensing unit connector 2300 may group the plurality of first and second electrodes 112 and 114 by twos or more to connect the grouped first and second electrodes to the first touch sensing unit 300.

Therefore, the first touch sensing unit connector 2300 may transfer one first touch scan pulse each, applied from the first touch sensing unit 300, to the two first electrodes 112 during the first period, and transfer first touch sensing signals, received from two second electrodes 114 each, to the first touch sensing unit 300. In other words, when the touch screen display device according to embodiments of the present invention operates in the touch sensing mode during the first period, the plurality of first electrodes 112 may perform a function of a touch driving electrode, and the plurality of second electrodes 114 may perform a function of a touch sensing electrode.

As a result, as illustrated in FIG. 7, when the touch screen display device according to embodiments of the present invention operates in the touch sensing mode during the first period according to the first sync signal, the plurality of first and second electrodes 112 and 114 may be connected to the first touch sensing unit 300 in units of two electrodes.

The second touch sensing unit connector 2400 may connect each of the plurality of first electrodes 112 and the plurality of second electrodes 114 to the second touch sensing unit 400 according to an operation of the switch 2100 which is performed by the second sync signal during the second period.

For example, as illustrated in FIG. 4, the second touch sensing unit connector 2400 may connect the plurality of first and second electrodes 112 and 114 to the second touch sensing unit 400 in one-to-one correspondence relationship.

Therefore, the second touch sensing unit connector 2400 may transfer a second touch scan pulse, applied from the second touch sensing unit 400, to the plurality of first and second electrodes 112 and 114 during the second period, and transfer a second touch sensing signal, received from each of the plurality of first and second electrodes 112 and 114, to the second touch sensing unit 400.

As a result, as illustrated in FIG. 8, when the touch screen display device according to embodiments of the present invention operates in the touch sensing mode during the second period according to the second sync signal, the plurality of first and second electrodes 112 and 114 may be connected to the second touch sensing unit 400.

In other words, during the first period, the touch screen display device groups the plurality of first and second electrodes 112 and 114 by at least twos to determine whether there is a touch in the mutual capacitance type, and during the second period, the touch screen display device determines whether there is a touch for each of the first and second electrodes 112 and 114 in the self-capacitance type. In comparison with the first period, during the second period, a size of a touch sensing unit is reduced, and thus, the size of the touch sensing unit is small. Accordingly, the second period is suitable to sense a pen touch based on the self-capacitance type enabling a single touch to be sensed, and the first period is suitable to sense a finger touch based on the mutual capacitance type enabling a multi-touch to be sensed.

Therefore, the touch screen display device according to embodiments of the present invention drives the plurality of first and second electrodes 112 and 114 in the temporally divided first and second periods, and thus senses a pen touch based on a self-capacitance type as well as a finger touch based on a mutual-capacitance type without providing a separate device for sensing the pen touch. Also, a size of a touch sensing unit for sensing the pen touch is smaller than that of a touch sensing unit for sensing the finger touch, and thus, a degree of accuracy for sensing the pen touch can be enhanced.

With further reference to FIG. 1, the first touch sensing unit 300 applies the first touch scan pulse to the switching unit 200, and the second touch sensing unit 400 applies the second touch scan pulse to the switching unit 200.

For example, the first touch sensing unit 300 may determine whether there is a touch based on the mutual capacitance type. The first touch sensing unit 300 may apply the first touch scan pulse to the plurality of first electrodes 112 through the switching unit 200 during the first period, and receive a plurality of first touch sensing signals from the plurality of second electrodes 114 through the switching unit 200 to determine whether there is a touch.

The second touch sensing unit 400 may determine whether there is a touch based on the self-capacitance type. The second touch sensing unit 400 may apply the second touch scan pulse to the plurality of first and second electrodes 112 and 114 through the switching unit 200 during the second period, and receive a plurality of second touch sensing signals from the plurality of first and second electrodes 112 and 114 through the switching unit 200 to determine whether there is a touch.

Therefore, the touch screen display device according to embodiments of the present invention can sense a touch based on the mutual capacitance type for sensing the finger touch, and moreover sense a touch based on the self-capacitance type for sensing the pen touch.

The switching unit, the first touch sensing unit, and the second touch sensing unit may be included in a circuit unit for driving the touch screen display device according to embodiments of the present invention. Hereinafter, a description on this will be made in more detail with reference to FIGS. 9 to 11.

Figure 9:
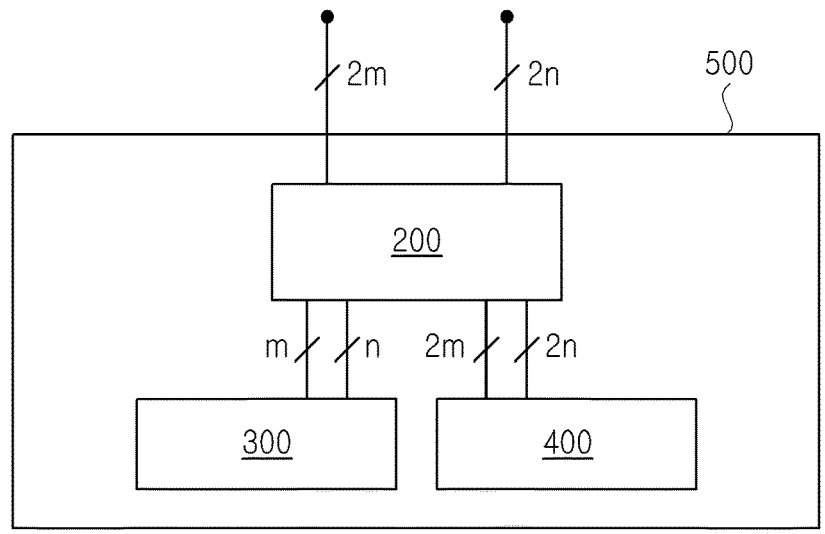
FIGS. 9 to 11 are diagrams illustrating embodiments of circuit units including a switching unit, first touch sensing unit, and second touch sensing unit of FIG. 1.
Figure 10:
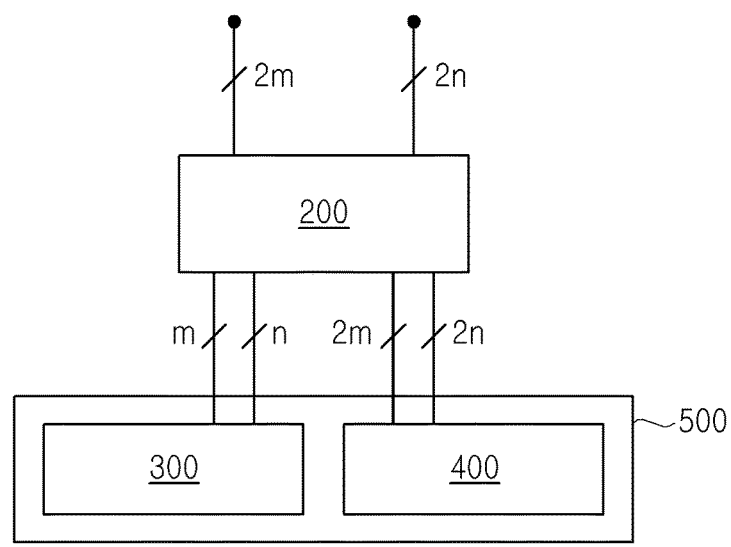
Figure 11:
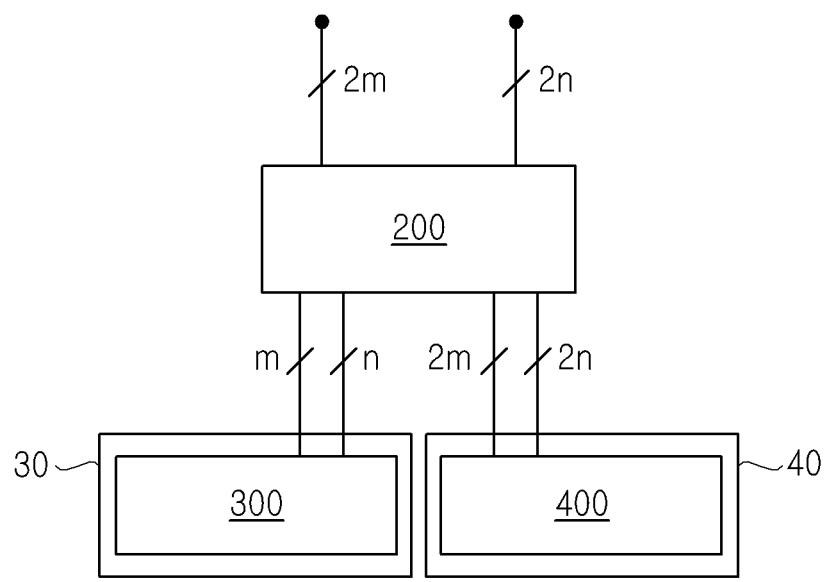

FIGS. 9 to 11 are diagrams illustrating embodiments of circuit units including the switching unit, first touch sensing unit, and second touch sensing unit of FIG. 1. Functions of the switching unit, first touch sensing unit, and second touch sensing unit have been described above in detail, and thus, their descriptions are not repeated below.

First, as illustrated in FIG. 9, the switching unit 200, the first touch sensing unit 300, and the second touch sensing unit 400 may be included in one touch IC 500.

For example, the one touch IC 500 may perform a switching function of the switching unit 200 that performs a switching operation on the touch scan pulse applied to the plurality of first and second electrodes 112 and 114, a function of the first touch sensing unit 300 that senses a touch based on the mutual capacitance type, and a function of the second touch sensing unit 400 that senses a touch based on the self-capacitance type.

Moreover, as illustrated in FIG. 10, the first touch sensing unit 300 and the second touch sensing unit 400 may be included in one touch IC 500.

Moreover, as illustrated in FIG. 11, the first touch sensing unit 300 may be included in a first touch IC 30, and the second touch sensing unit 400 may be included in a second touch IC 40. In other words, each of the first touch sensing unit 300 and the second touch sensing unit 400 may be included in a separate touch IC.

For example, the first touch IC 30 including the first touch sensing unit 300 that senses a touch based on the mutual capacitance type may sense the finger touch, and the second touch IC 40 including the second touch sensing unit 400 that senses a touch based on the self-capacitance type may sense the pen touch.

Therefore, the touch screen display device according to embodiments of the present invention drives the plurality of first and second electrodes in the temporally divided first and second periods, and thus senses a pen touch based on a self-capacitance type as well as a finger touch based on a mutual-capacitance type without providing a separate device for sensing the pen touch. Also, a size of a touch sensing unit for sensing the pen touch is smaller than that of a touch sensing unit for sensing the finger touch, and thus, a degree of accuracy for sensing the pen touch can be enhanced.

According to the embodiments of the present invention, one touch screen display device with a built-in panel senses a pen touch in addition to a finger touch without adding a separate pen touch input device.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A touch screen display device, comprising:
   a display panel;
   a touch screen panel disposed on the display panel, and configured to include a plurality of first electrodes, which are parallelly arranged in a first direction, and a plurality of second electrodes which are parallelly arranged in a second direction;
   a switching unit configured to apply a first touch scan pulse to the plurality of first electrodes during a first period within one frame, and apply a second touch scan pulse to each of the plurality of first electrodes and each of the plurality of second electrodes during a second period within the one frame;
   a first touch sensing unit configured to:
      apply the first touch scan pulse to the switching unit; and
      determine whether there is a finger touch on the touch screen panel by driving a plurality of first touch sensing signals on the plurality of first electrodes, and not on the plurality of second electrodes, during the entire first period; and
   a second touch sensing unit configured to:
      apply the second touch scan pulse to the switching unit; and
      determine whether there is a pen touch on the touch screen panel by driving a plurality of second touch sensing signals on the each of the plurality of first electrodes and the each of the plurality of second electrodes during the second period,
   wherein the one frame is temporally divided into the first period and the second period,
   wherein the first touch sensing unit is further configured to sense only the finger touch based on a mutual capacitance type,
   wherein the second touch sensing unit is further configured to sense only the pen touch based on a self-capacitance type, and
   wherein the switching unit is further configured to, only during the first period:
      group the plurality of first electrodes by at least twos to connect the grouped first electrodes to the first touch sensing unit, and
      group the plurality of second electrodes by at least twos to connect the grouped second electrodes to the first touch sensing unit.

2. The touch screen display device of claim 1, wherein:
   the switching unit receives a plurality of first touch sensing signals from the grouped second electrodes and transfers the plurality of first touch sensing signals to the first touch sensing unit only during the first period; and
   the first touch sensing unit determines whether there is the finger touch by using the plurality of first touch sensing signals.

3. The touch screen display device of claim 1, wherein the switching unit connects the each of the plurality of first electrodes and the each of the plurality of second electrodes to the second touch sensing unit only during the second period.

4. The touch screen display device of claim 1, wherein:
   the switching unit receives a plurality of second touch sensing signals from the each of the plurality of first electrodes and the each of the plurality of second electrodes and transfers the plurality of second touch sensing signals to the second touch sensing unit only during the second period; and
   the second touch sensing unit determines whether there is the pen touch by using the plurality of second touch sensing signals.

5. The touch screen display device of claim 1, wherein the switching unit, the first touch sensing unit and the second touch sensing unit are comprised in one touch IC.

6. The touch screen display device of claim 1, wherein the first touch sensing unit and the second touch sensing unit are comprised in different touch ICs, respectively.

7. The touch screen display device of claim 1, wherein:
   the first touch sensing unit is further configured to sense a multi-touch based on a mutual capacitance type during the first period; and
   the second touch sensing unit is further configured to sense a single-touch based on a self-capacitance type during the second period.

8. The touch screen display device of claim 1, wherein a size of a touch sensing unit for sensing the pen touch is smaller than a size of a touch sensing unit for sensing the finger touch.

9. A touch integrated circuit (IC), which determines whether there is a touch by using a plurality of first electrodes and a plurality of second electrodes which are included in a touch panel, the touch IC comprising:
   a switching unit configured to:
      output a first touch scan pulse to the plurality of first electrodes during an entire first period within one frame; and
      output a second touch scan pulse to each of-the plurality of first electrodes and each of the plurality of second electrodes during a second period within the one frame;
   a first touch sensing unit configured to:
      apply the first touch scan pulse to the switching unit; and
      determine whether there is a finger touch on the touch screen panel by driving a plurality of first touch sensing signals on the first electrodes, and not from the plurality of second electrodes; and
   a second touch sensing unit configured to:
      apply the second touch scan pulse to the switching unit; and
      determine whether there is a pen touch on the touch screen panel by driving a plurality of second touch sensing signals on the each of the plurality of first electrodes and the each of the plurality of second electrodes,
   wherein the one frame is temporally divided into the first period and the second period,
   wherein the first touch sensing unit is further configured to sense only the finger touch based on a mutual capacitance type,
   wherein the second touch sensing unit is further configured to sense only the pen touch based on a self-capacitance type, and
   wherein the switching unit is further configured to, only during the first period:
      group the plurality of first electrodes by at least twos to connect the grouped first electrodes to the first touch sensing unit, and
      group the plurality of second electrodes by at least twos to connect the grouped second electrodes to the first touch sensing unit.

10. The touch IC of claim 9, wherein the switching unit connects the each of the plurality of first electrodes and the each of the plurality of second electrodes to the second touch sensing unit only during the second period.

11. The touch IC of claim 9, wherein:
the first touch sensing unit is further configured to sense a multi-touch based on a mutual capacitance type during the first period; and
the second touch sensing unit is further configured to sense a single-touch based on a self-capacitance type during the second period.

12. The touch IC of claim 9, wherein a size of a touch sensing unit for sensing the pen touch is smaller than a size of a touch sensing unit for sensing the finger touch.

* * * * *